(12) United States Patent
Mittlestadt

(10) Patent No.: US 9,564,280 B2
(45) Date of Patent: Feb. 7, 2017

(54) PANEL BOARD TO CIRCUIT BREAKER POSITIVE RETENTION INTERLOCK

(71) Applicant: SCHNEIDER ELECTRIC USA, INC., Palatine, IL (US)

(72) Inventor: Chad R. Mittlestadt, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 218 days.

(21) Appl. No.: 14/449,881

(22) Filed: Aug. 1, 2014

(65) Prior Publication Data

US 2016/0035526 A1    Feb. 4, 2016

(51) Int. Cl.
| | |
|---|---|
| *H01H 71/02* | (2006.01) |
| *H01H 71/12* | (2006.01) |
| *H01H 73/08* | (2006.01) |
| *H02B 1/056* | (2006.01) |

(52) U.S. Cl.
CPC ....... *H01H 71/0264* (2013.01); *H01H 71/126* (2013.01); *H01H 73/08* (2013.01); *H02B 1/056* (2013.01)

(58) Field of Classification Search
CPC ............ H01H 71/02; H01H 9/22; H01H 9/20; H02B 1/04
USPC ..... 200/50.02, 50.21, 50.17, 50.12; 361/641, 361/644, 646–647, 651–652
See application file for complete search history.

(56) References Cited

U.S. PATENT DOCUMENTS 5,546,060 A * 8/1996 Mrenna .............. H01H 71/0214
335/202

FOREIGN PATENT DOCUMENTS

| EP | 1148530 A1 | 10/2001 |
|---|---|---|
| JP | 3861401 B2 | 12/2006 |

OTHER PUBLICATIONS

European Search Report for European Patent Application No. 15179259.5 dated Oct. 8, 2015.

* cited by examiner

*Primary Examiner* — Edwin A. Leon
*Assistant Examiner* — Iman Malakooti
(74) *Attorney, Agent, or Firm* — Locke Lord LLP

(57) ABSTRACT

An interlock assembly for a circuit breaker prevents inadvertent installation or removal of the circuit breaker from a circuit breaker panel while current is flowing. The interlock assembly cooperates with the circuit breaker panel to physically prevent the circuit breaker from being inserted into the circuit breaker panel until the circuit breaker is put into a tripped state. Likewise, the interlock assembly cooperates with the circuit breaker panel to physically prevent the circuit breaker from being taken out of the circuit breaker panel until the circuit breaker is put into a tripped state. This ensures that the circuit breaker will not be inadvertently installed or removed from the circuit breaker panel while current can immediately flow or is flowing through the circuit breaker.

20 Claims, 6 Drawing Sheets

PANEL BOARD TO CIRCUIT BREAKER POSITIVE RETENTION INTERLOCK

FIELD OF THE INVENTION

The disclosed embodiments relate generally to miniature circuit breakers ("MCB") and more particularly to a miniature circuit breaker having a positive retention mechanism that trips the circuit breaker during installation and removal of the circuit breaker.

BACKGROUND OF THE INVENTION

Circuit breakers provide automatic power interruption to an electrical load when fault conditions occur, such as an overload current or a short circuit. A circuit breaker is typically deployed on a line conductor between a load and a current source, usually an electric main. The current source provides current over the line conductor through the circuit breaker and to the load, which is typically also connected to ground or neutral. A neutral conductor provides a return path from the load through the circuit breaker and back to the current source.

A typical circuit breaker has a load terminal for connecting the circuit breaker to the load and a line terminal for connecting the circuit breaker to the line conductor. A braided wire conductor carries current from the line terminal to one side of a trip unit. The other side of the trip unit is connected to the load terminal by an electrical contact that provides a path for current to flow through the circuit breaker. The trip unit typically includes an armature having an opening therein for engaging and holding a latch of the trip unit. During normal operation, the armature remains in the latched position and current is allowed to flow through the circuit breaker. When a fault condition occurs, the armature is moved to the unlatched position, tripping the circuit breaker and interrupting the flow of current.

In most residential and commercial establishments, the circuit breakers are installed in a circuit breaker panel that serves as a central distribution point for the various loads in the establishments. The circuit breaker panel typically has a plurality of compartments and the circuit breakers are plugged or otherwise installed in the panel by pressing or inserting them into the compartments. Each compartment typically includes a bracket, guides, openings, and/or other means for receiving and engaging the circuit breaker.

Occasionally, it may be necessary to unplug a circuit breaker from the circuit breaker panel. For example, the circuit breaker may need to be removed for servicing or maintenance, or it may need to be replaced with another circuit breaker with a different current rating due to new load requirements. Preferably the circuit breaker panel is de-energized before the circuit breaker is removed, but in some situations it is not feasible to de-energize the panel. In these situations, it is prudent to ensure the circuit breaker is in the tripped state so current is not flowing at the time the circuit breaker is removed from the panel. If the circuit breaker is inadvertently removed while current is flowing, arcing may occur, potentially leading to electrical shock, arc flash, load damage, or other hazardous event. For the same reasons, it is equally important to ensure the circuit breaker is in the tripped state during installation so the circuit breaker is not inadvertently plugged in while current is able to immediately flow through it.

Accordingly, a need exists for an improved circuit breaker that addresses the above and other problems, and particularly a circuit breaker with a mechanism that prevents the circuit breaker from being inadvertently installed or removed while current can immediately flow or is flowing through the circuit breaker.

SUMMARY OF THE DISCLOSED EMBODIMENTS

The disclosed embodiments address the above and other problems by providing a circuit breaker that prevents inadvertent installation or removal of the circuit breaker from a circuit breaker panel while current is flowing. The circuit breaker includes, among other things, an interlock assembly that interacts with the circuit breaker panel to put the circuit breaker into a tripped state before the circuit breaker may be installed or removed from the circuit breaker panel. Specifically, the interlock assembly and the circuit breaker panel physically prevent the circuit breaker from being inserted until after the circuit breaker is put into a tripped state. Likewise the interlock assembly and the circuit breaker panel physically prevent the circuit breaker from being taken out until after the circuit breaker is put into a tripped state. This ensures that the circuit breaker will not be inadvertently installed or removed from the circuit breaker panel while current can immediately flow or is flowing through the circuit breaker. Such embodiments are particularly suited for use with miniature circuit breakers (MCB), although the embodiments may certainly be used in other types of circuit breakers known to those having ordinary skill in the art where appropriate.

In some embodiments, the circuit breaker includes a trip unit and the interlock assembly includes an interference member designed to interfere with the normal operation of the trip unit. The interference member may be moved from an interfering position in which it prevents the trip unit from being set or reset, thereby keeping the circuit breaker in a tripped state, to a non-interfering position in which the trip unit is allowed to be set or reset, thereby permitting the circuit breaker placed in an ON state. An externally accessible actuator may then be provided for moving the interference member from the interfering position to the non-interfering position. The actuator works in tandem with the circuit breaker panel to prevent the circuit breaker from being inserted in the circuit breaker panel until after the interference member is in the interfering position. In some embodiments, the interlock assembly may further include a biasing member, such as a helical spring, arranged to continuously compel the interference member toward the interfering position.

In some embodiments, the actuator may be a locking pin movably mounted vertically and adjacent to one side of the circuit breaker, and the interference member may be a blocking arm or link in the circuit breaker movably mounted generally horizontally relative to the locking pin. When in the interfering position, the blocking arm blocks an armature of the trip unit from latching or otherwise engaging a latch of the trip unit, so the circuit breaker remains in a tripped state. Conversely, when the blocking arm is in the non-interfering position, the armature is allowed to operate normally, and the circuit breaker may be put into an ON state. The locking pin includes a head portion connected to a shaft and may be rotated between a locked position and an unlocked position by using a screwdriver or similar tool to turn the head portion. A drive post protruding perpendicularly from the shaft of the locking pin loosely couples the blocking arm to the locking pin. As the locking pin is rotated from the unlocked position to the locked position, the drive post revolves with the locking pin and catches the blocking arm in its interfering position. As the locking pin continues to rotate into the locked position, the drive post moves the blocking arm from the interfering position to the non-interfering position. Once the blocking arm is in the non-interfering position, the armature is no longer impeded, and the circuit breaker may be set or reset in the ON state as needed.

In some embodiments, the locking pin may further include a retention post protruding perpendicularly from the shaft of the locking pin, and the circuit breaker panel may include a retaining structure, such as a retention bar or an overhang, for engaging the retention post. The retention post is aligned with the unlocked position of the locking pin such that the circuit breaker cannot be inserted in the circuit breaker panel unless the locking pin is in the unlocked position. If the locking pin is in the locked position, the retention post interacts with the circuit breaker panel to physically prevent the circuit breaker from being inserted in the panel. This ensures the circuit breaker cannot be inserted in the circuit breaker panel while current is able to immediately flow through circuit breaker, as the rotation of the locking pin into the unlocked position also causes the drive post to move the blocking arm into the interfering position, thereby tripping the circuit breaker. In some embodiments, the above alignment of the retention post with the unlocked position of the locking pin may be achieved by positioning the retention post on the locking pin a predefined angular distance, for example, about 70 degrees, from the drive post.

Once the circuit breaker is in the circuit breaker panel, normal operation of the circuit breaker may commence or resume by rotating the locking pin into the locked position, thus moving the blocking arm into the non-interfering position. This causes the retention post to revolve into engagement with the retaining structure of the circuit breaker panel, thereby preventing the circuit breaker from being inadvertently removed from the circuit breaker panel while current may be flowing through the circuit breaker.

In some embodiments, instead of a locking pin and a horizontal blocking arm, the interlock assembly may simply comprise a vertically mounted blocking arm protruding from the bottom of the circuit breaker and extending toward the armature. Like the horizontal blocking arm, the vertical blocking arm may be movable between an interfering position in which it prevents the armature from latching or engaging the latch of the trip unit, and a non-interfering position in which the armature is allowed to operate normally. Such a blocking arm may then be moved into the interfering position by pushing the circuit breaker down into the circuit breaker panel such that contact with the circuit breaker panel imparts a linear force that raises the blocking arm into the interfering position. In alternative embodiments, instead of pushing down the circuit breaker into the circuit breaker panel, the circuit breaker may be mounted by sliding the circuit breaker laterally into the circuit breaker panel. In these embodiments, the blocking arm may be mounted on a pivot or hinge and the sliding of the circuit breaker into the circuit breaker panel imparts a rotary force that rotates the blocking arm into the interfering position.

In general, in one aspect, the disclosed embodiments are directed to an interlock assembly for a circuit breaker. The interlock assembly comprises, among other things, an interfering member movable between an interfering position and a non-interfering position, the interfering member configured to prevent the circuit breaker from being in, or being set to, an ON state when the interfering member is in the interfering position, and allow the circuit breaker to be in, or be set to, the ON state when the interfering member is in the non-interfering position. The interlock assembly further comprises an actuator movable between a locked position and an unlocked position, the actuator configured to operate in tandem with a circuit breaker panel to prevent insertion of the circuit breaker into the circuit breaker panel when the actuator is in the locked position, and allow insertion of the circuit breaker into the circuit breaker panel when the actuator is in the unlocked position. The actuator is coupled to the interfering member such that moving the actuator into the unlocked position also moves the interfering member into the interfering position and causes the circuit breaker to trip if the breaker is in the ON state.

In general, in another aspect, the disclosed embodiments are directed to a miniature circuit breaker. The miniature circuit breaker comprises, among other things, a line terminal, a load terminal, and a trip unit connected between the line terminal and the load terminal, the trip unit configured to interrupt current flow between the line terminal and the load terminal when the trip unit is tripped. The miniature circuit breaker further comprises an interlock assembly coupled to the trip unit and configured to operate in tandem with a circuit breaker panel to prevent insertion of the circuit breaker into the circuit breaker panel until after the trip unit has been tripped, and prevent removal of the circuit breaker from the circuit breaker panel until after the trip unit has been tripped.

In general, in still another aspect, the disclosed embodiments are directed to an interlock assembly for a miniature circuit breaker. The interlock assembly comprises, among other things, a blocking arm mounted in the miniature circuit breaker and movable between an interfering position and a non-interfering position, the blocking arm configured to cause a trip and block a set or reset operation of a trip unit of the circuit breaker when the blocking arm is in the interfering position, and allow the set or reset operation of the trip unit when the blocking arm is in the non-interfering position. The interlock assembly further comprises a spring coupled to the blocking arm and configured to continuously bias the blocking arm toward the interfering position, and a locking pin coupled to the blocking arm and movable between a locked position and an unlocked position, the locking pin configured to operate in tandem with a circuit breaker panel to prevent insertion of the circuit breaker into the circuit breaker panel when the locking pin is in the locked position, and allow insertion of the circuit breaker into the circuit breaker panel when the locking pin is in the unlocked position. The locking pin is coupled to the blocking arm in such a way that moving the locking pin into the locked position also moves the blocking arm into the non-interfering position, and moving the locking pin into the unlocked position also moves the blocking arm into the interfering position.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, the exemplary disclosed embodiments provide a circuit breaker having an interlock assembly that interacts with a circuit breaker panel to prevent inadvertent installation or removal of the circuit breaker from the circuit breaker panel while current is flowing. The disclosed embodiments are particularly suited for use with miniature circuit breakers (MCB) owing to their small size and therefore limited amount of internal space within which to implement safety trip mechanisms. The embodiments are also suited for use with other types of circuit breakers, although such circuit breakers typically have other safety trip mechanisms built in.

Figure 1A:
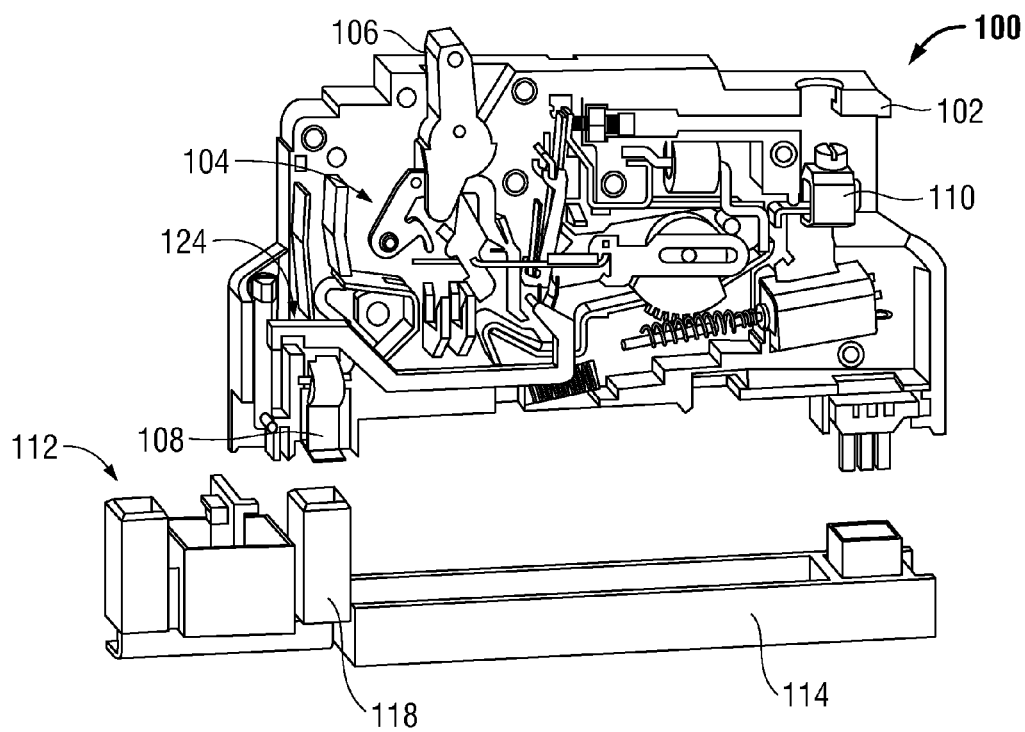
FIGS. 1A and 1B are internal views of an interlock assembly according to some implementations of the disclosed embodiments.
Figure 1B:
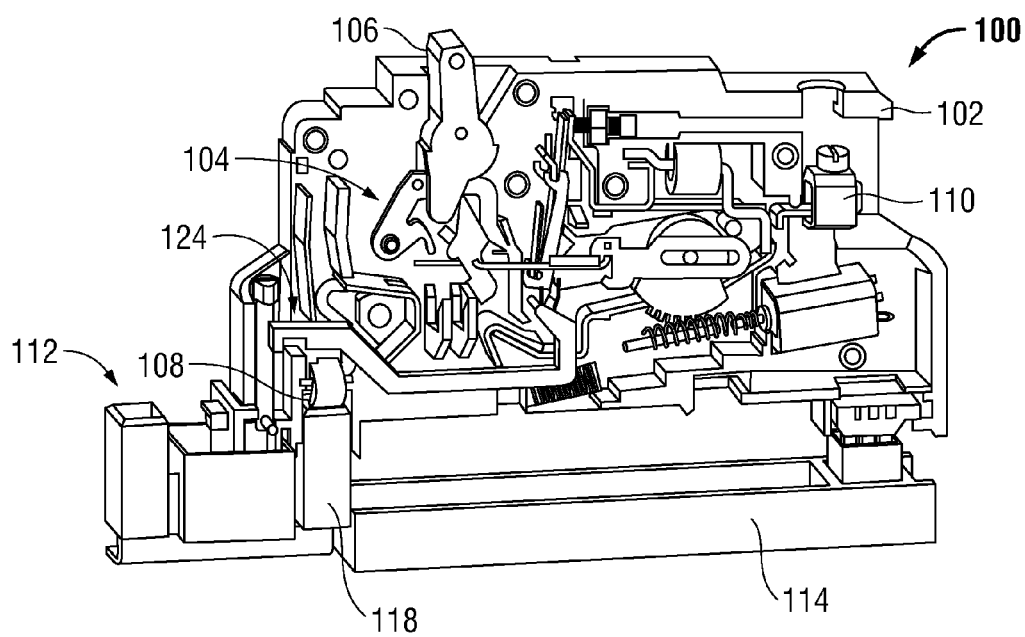

Referring now to FIGS. 1A and 1B, an example of a circuit breaker 100 according to the exemplary disclosed embodiments is shown. As can be seen, the circuit breaker 100 may include a molded casing 102 (one half of which is shown here) enclosing a trip unit 104 to which a handle 106 may be attached. The handle 106 allows a user to manually set or reset the trip unit 104 to an ON state, an OFF state, or a tripped state. A line terminal 108 electrically connects the trip unit 104 to a line conductor and a load terminal 110 electrically connects the trip unit 104 to a load. When an abnormal current condition is detected, the trip unit 104 automatically breaks the electrical connection between the line terminal 108 and the load terminal 110, thereby interrupting the flow of current through the circuit breaker 100.

The circuit breaker 100 is typically installed in a circuit breaker panel 112, only a portion of which is shown here, by inserting it into one of a plurality of compartments 114 in the panel (only one compartment shown here). For the present example, this entails aligning the line terminal 108 of the circuit breaker 100 with a line port 118 of the circuit breaker panel 112, as shown in FIG. 1A.

In accordance with the exemplary disclosed embodiments, the circuit breaker 100 includes a manually-controlled interlock assembly 124 that works in tandem with the circuit breaker panel 112 to keep the circuit breaker 100 from being inserted into the panel until after the trip unit 104 is in the tripped state. This prevents inadvertent installation of the circuit breaker 100 in the circuit breaker panel 112 while current is able to immediately flow through the circuit breaker. Specifically, the circuit breaker panel 112 requires the interlock assembly 124 to put the trip unit 104 into the tripped state before the circuit breaker 100 can be fully inserted into the panel. Only after the trip unit 104 is in the tripped state will a user be able to fully press the circuit breaker 100 into the compartment 114, as shown in FIG. 1B.

In a similar manner, once the circuit breaker 100 is installed in the circuit breaker panel 112, it cannot be removed until after the interlock assembly 124 puts the trip unit 104 into the tripped state. That is, the interlock assembly 124 works in conjunction with the circuit breaker panel 112 to positively retain the circuit breaker 100 in the compartment 114 until after the trip unit 104 is in the tripped state. Only after the trip unit 104 is in the tripped state will a user be able to pull the circuit breaker 100 from the compartment 114.

Figure 2A:
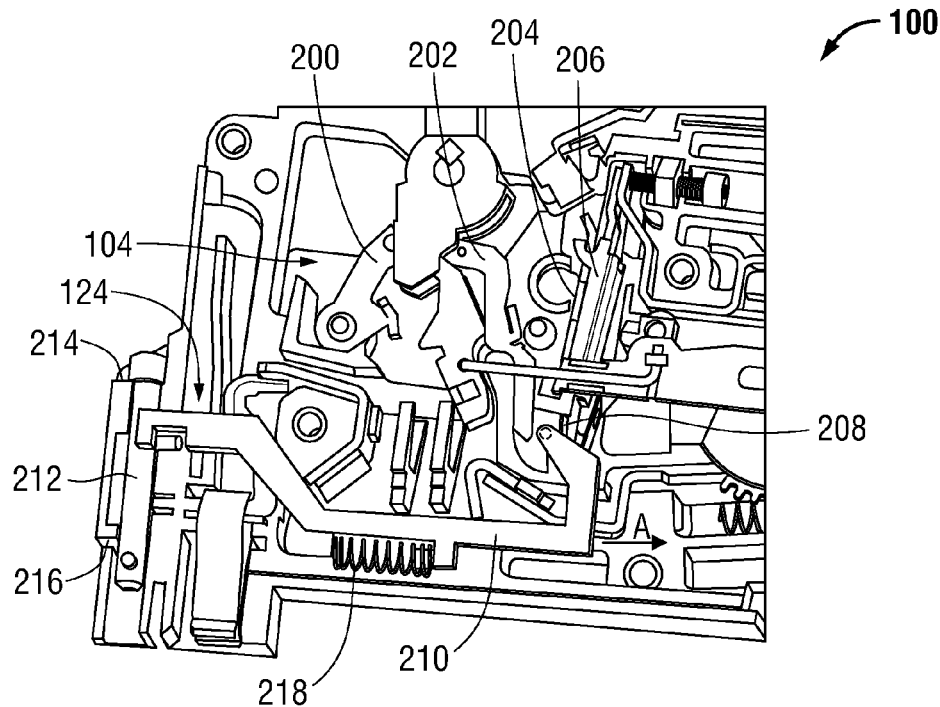
FIGS. 2A and 2B are close-up views of an interlock assembly according to some implementations of the disclosed embodiments to an existing bushing.
Figure 2B:
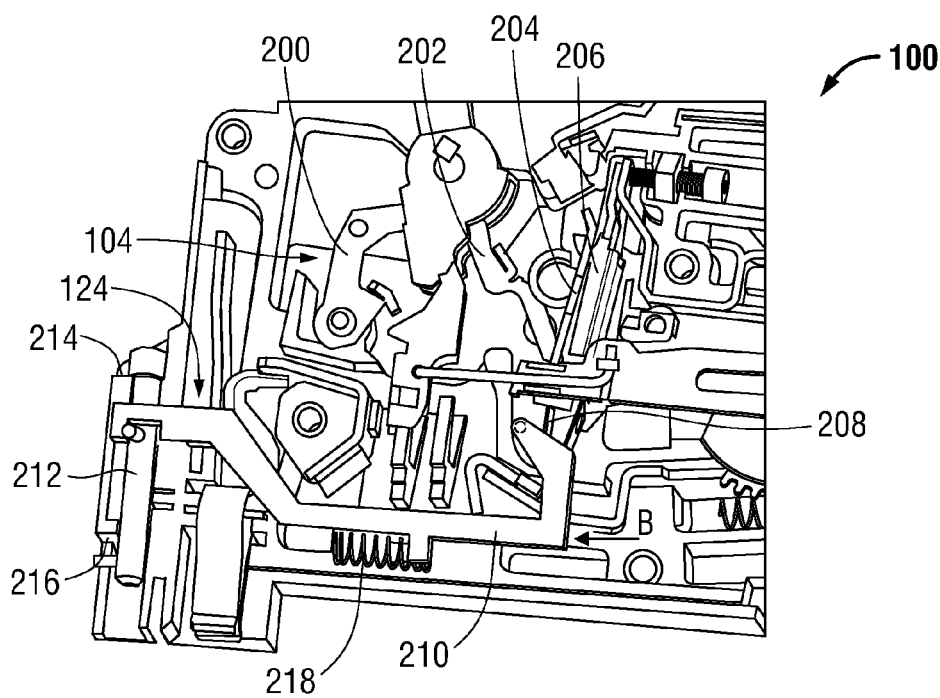

FIGS. 2A and 2B are close-up views of the trip unit 104 and the interlock assembly 124. As can be seen, the trip unit 104 may include a generally U-shaped trip lever 200 having a latch 202 that is designed to engage an armature 204 attached to a yoke 206. Operation of the trip unit 104 is generally well known to those having ordinary skill in the art and is explained only briefly here. In general, setting or resetting the trip unit 104 in the ON state engages the latch 202 to the armature 204, closes a movable electrical contact to a stationary contact, and allows current to flow through the circuit breaker 100. An abnormal current or fault condition, such as an overcurrent or a short-circuit current, causes the armature 204 to be pulled back away from the latch 202, which releases the latch 202. The release of the latch 202 trips the trip unit 104, which opens the contacts and breaks the electrical path between the line terminal 108 and the load terminal 110.

In some embodiments, the armature 204 is pulled away from the latch 202 in a fault condition by a bimetal member 208 attached to the armature 204. The bimetal member 208 is designed to heat up and bend or distort during an overcurrent, which moves the armature 204 away from latch 202. In the example shown here, a portion of the bimetal member 208 can be seen extending from the bottom of the armature 204, with the rest of the bimetal member 208 running along the length of the armature 204 being hidden from view behind the yoke 206. Any suitable or commonly used bimetal structure may be used for the bimetal member 208, as the particular form of the bimetal member 208 is not critical to the operation of the disclosed embodiments. For example, in some embodiments, the portion of the bimetal member 208 extending from the bottom of the armature 204 may be a secondary bimetal called a thermal compensator that is welded to the main bimetal. If a circuit breaker does not need thermal compensation, then the portion of the bimetal member 208 extending from the bottom of the armature 204 may simply be a piece of steel that can be used as an interface, for example, to allow a GFI solenoid to pull on in order to trip the breaker.

Based on the foregoing, one of the ways for the interlock assembly 124 to put the trip unit 104 into the tripped state is by moving the armature 204 away from the latch 202. To achieve this, the interlock assembly 124 may include an interfering member 210 configured to move the armature 204 away from the latch 202 and an actuator 212 coupled to actuate the interfering member 210. The actuator 212 may be operated to put the interfering member 210 into an interfering position (see FIG. 2A) where it interferes with the normal function of the armature 204, and a non-interfering position (see FIG. 2B) where it allows the armature 204 to function normally. More specifically, putting the interfering member 210 into the interfering position causes it to push the bimetal member 208 and the armature 204 attached thereto in a direction away from the latch 202, as indicated by the arrow A, and causes a trip if the trip unit 104 was set. Once in the interfering position, any attempt at setting or resetting the trip unit 104 will fail because the latch 202 cannot physically latch on to the armature 204. Putting the interfering member 210 into the non-interfering position causes it to move in the opposite direction away from the bimetal member 208, as indicated by the arrow B, which allows the trip unit 104 to be set because the interfering member 210 no longer interferes with the latch 202 being latched onto the armature 204.

In accordance with the disclosed embodiments, operating the actuator 212 to put the interfering member 210 into the non-interfering position also puts the actuator 212 into a locked position (see FIG. 2B) where it works together with the circuit breaker panel 112 to prevent insertion and removal of the circuit breaker 100 into the panel. More specifically, when the actuator 212 is in the locked position, its path into the circuit breaker panel 112 is physically obstructed, for example, by a ledge 214 or similar structure of the circuit breaker panel 112, so the circuit breaker 100 cannot be inserted into the panel. And if the circuit breaker 100 is already inserted in the circuit breaker panel 112, then the actuator 212 is physically restrained, for example, by an overhang 216 or similar catch structure of the circuit breaker panel 112, so the circuit breaker 100 cannot be removed from the panel. Conversely, operating the actuator 212 to put the interfering member 210 into the interfering position puts the actuator 212 into an unlocked position (see FIG. 2A) where it is neither obstructed nor restrained by the circuit breaker panel 112, so the circuit breaker 100 may be freely inserted and removed from the panel, as further explained below. Such an arrangement helps avoid inadvertent insertion or removal of the circuit breaker 100 until after the interfering member 210 has been put into the interfering position to put the trip unit 104 into the tripped state.

In some embodiments, the interlock assembly 124 may also include a biasing member 218, such as a coiled spring and the like, that is configured to bias the interfering member 210 toward the interfering position. In these embodiments, the biasing member 218 may do most or all of the work when moving the interfering member 210 from the non-interfering position to the interfering position. In these embodiments, a quarter-turn twist lock or similar fastening mechanism (not expressly shown) may be provided on the actuator 212 to help hold the actuator 212 in the locked position so the biasing member 218 does not inadvertently move the interfering member 210 into the interfering position. In some embodiments, the way the actuator 212 may be coupled to the interfering member 210 may also allow it to move, or assist in moving, the interfering member 210 to the interfering position, for example, when the biasing member 214 may not be fully functional.

Figure 3:
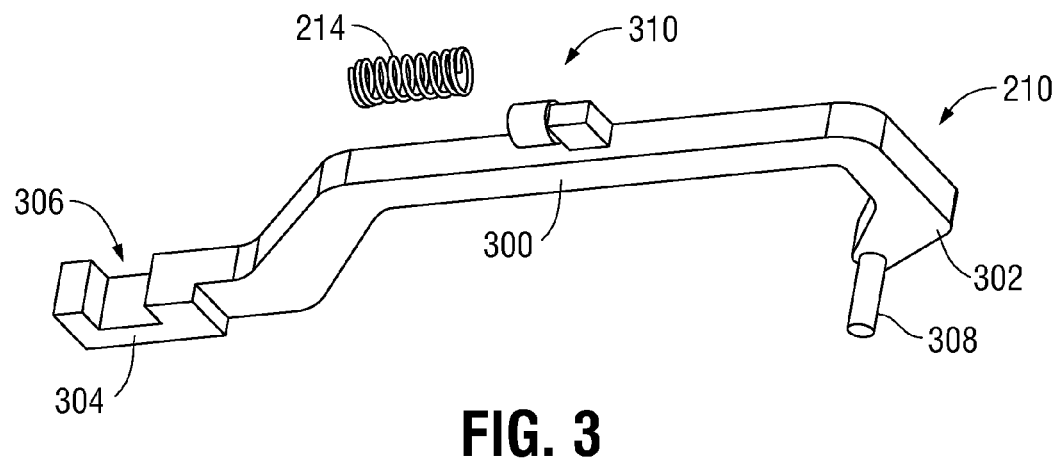
FIG. 3 is a perspective view of an interfering member with a blocking arm according to some implementations of the disclosed embodiments.

A perspective view of the interfering member 210 according to some embodiments is shown in FIG. 3. It will be understood that although FIG. 3 shows a specific embodiment, this embodiment is exemplary only and the actual design, shape, and dimensions of a real-world implementation may vary as needed to accommodate the requirements of an actual commercial product without departing from the scope of the disclosed embodiments.

As can be seen in FIG. 3, in some embodiments, the interfering member 210 may be in the form of a blocking arm or link 300. The main features of the blocking arm 300 may include a blocking end 302 and a drive end 304 opposite the blocking end 302. The drive end 304 is configured so that it may easily couple with the actuator 212 and therefore, in some embodiments, may have a slot 306 or similar structure formed therein to engage the actuator 212, as described later herein. The blocking end 302 functions to push the bimetal member 208 of the armature 204 and thus, in some embodiments, may have a blocking post 308 or similar structure protruding therefrom for physically contacting the bimetal member 208. Additionally, for embodiments where the biasing member 218 is used (see FIGS. 2A and 2B), an anchor assembly 310 or other suitable mechanism may be provided on the blocking arm 300 to anchor or otherwise secure the biasing member 218 to the blocking arm 300.

Figure 4:
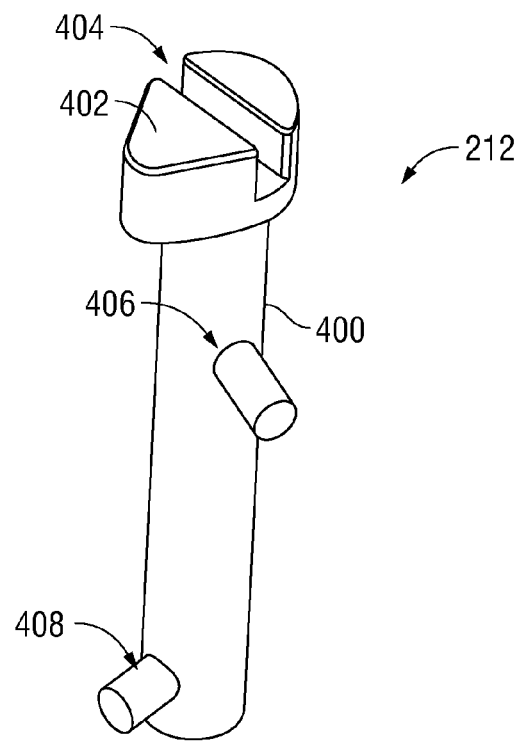
FIG. 4 is a perspective view of a locking pin according to some implementations of the disclosed embodiments.

The actuator 212 is shown in more detail in FIG. 4 according to some embodiments. As with the previous figure, it will be understood that although a specific embodiment is shown in FIG. 4, the embodiment is exemplary only.

As FIG. 4 shows, in some embodiments, the actuator 212 may be in the form of a locking pin having an elongated shaft 400 and a head portion 402 at one end of the shaft 400. A groove 404 may be provided in the head portion 402 for receiving a screwdriver or similar tool capable of turning the locking pin 212 via the groove 404. The locking pin 212 may also include a drive post 406 protruding from the shaft 400 for driving the blocking arm 300. When the locking pin 212 is properly assembled with the blocking arm 300, the drive post 406 of the locking pin 212 engages the slot 306 of the blocking arm 300 such that rotating the locking pin 212 also drives the blocking arm 300. As well, the locking pin 212 may further include a retention post 408 protruding from the shaft 400 for obstructing or restraining the locking pin 212 (and hence the circuit breaker 100) from being inserted into or removed from the circuit breaker panel 112, as described above with respect to FIGS. 2A and 2B.

In accordance with the disclosed embodiments, the drive post 406 may be spaced apart from the retention post 408 by a predefined linear distance and a predefined angular distance such that when the drive post 406 drives the blocking arm 300 into the non-interfering position, the retention post 408 is revolved (e.g., clockwise) into position where it is obstructed or restrained by the circuit breaker panel 112, respectively. When the retention post 408 is in this position, the locking pin 212 is in the locked position and the circuit breaker 100 cannot physically be inserted into or removed from the circuit breaker panel 112. In some embodiments, the predefined angular distance may be approximately 70 degrees and the predefined linear distance may be about 0.5 inches. Conversely, when the blocking arm 300 is in the interfering position, the drive post 406 has revolved (e.g., counterclockwise) sufficiently for the retention post 408 to be in an unobstructed and unrestrained position. When the retention post 408 is in this position, the locking pin 212 is in the unlocked position and the circuit breaker 100 may be freely inserted into and removed from the circuit breaker panel 112.

Note in the foregoing that only one half of the molded casing 102 (see FIGS. 1A and 1B) is shown in order to facilitate viewing. The other half of the molded casing 102, although not expressly shown, is substantially a mirror of image of the half that is shown, including the overhang 216 (see FIGS. 2A and 2B), such that when the two halves are assembled, a space is formed under the overhang 216 within which the retention post 408 may rotate.

In general operation, the locking pin 212 is in the unlocked position when the blocking arm 212 is in the interfering position. The biasing member 218 keeps the blocking arm 212 in the interfering position so that the blocking post 308 is pushing back the bimetal member 208, which keeps the armature 204 from engaging the latch 202. The retention pin 408 is unobstructed and unrestrained at this time, allowing the circuit breaker 100 to be inserted into or removed from the circuit breaker panel 112 as needed. As the locking pin 212 is rotated (e.g., clockwise) from the unlocked position to the locked position, the drive post 406 revolves and catches the drive end 304 of the blocking arm 300 via the slot 306. As the locking pin 212 continues to rotate into the locked position, the drive post 406 continues to drive the blocking arm 212, moving it from the interfering position to the non-interfering position. Once the blocking arm 300 is in the non-interfering position, the blocking post 308 is no longer pushing back the bimetal member/thermal compensator 208 and the armature 204 is allowed to engage the latch 202. The retention pin 408 is now either obstructed or restrained by the circuit breaker panel 112, thereby preventing the circuit breaker 100 from being inserted into or removed from the circuit breaker panel 112.

In some embodiments, the head portion 402 of the locking pin 212 may have a shape resembling an ovoid so that it is more rounded on one side of the groove 404 compared to the other side in order to see more quickly whether locking pin 212 is in the locked or the unlocked position.

Figure 5:
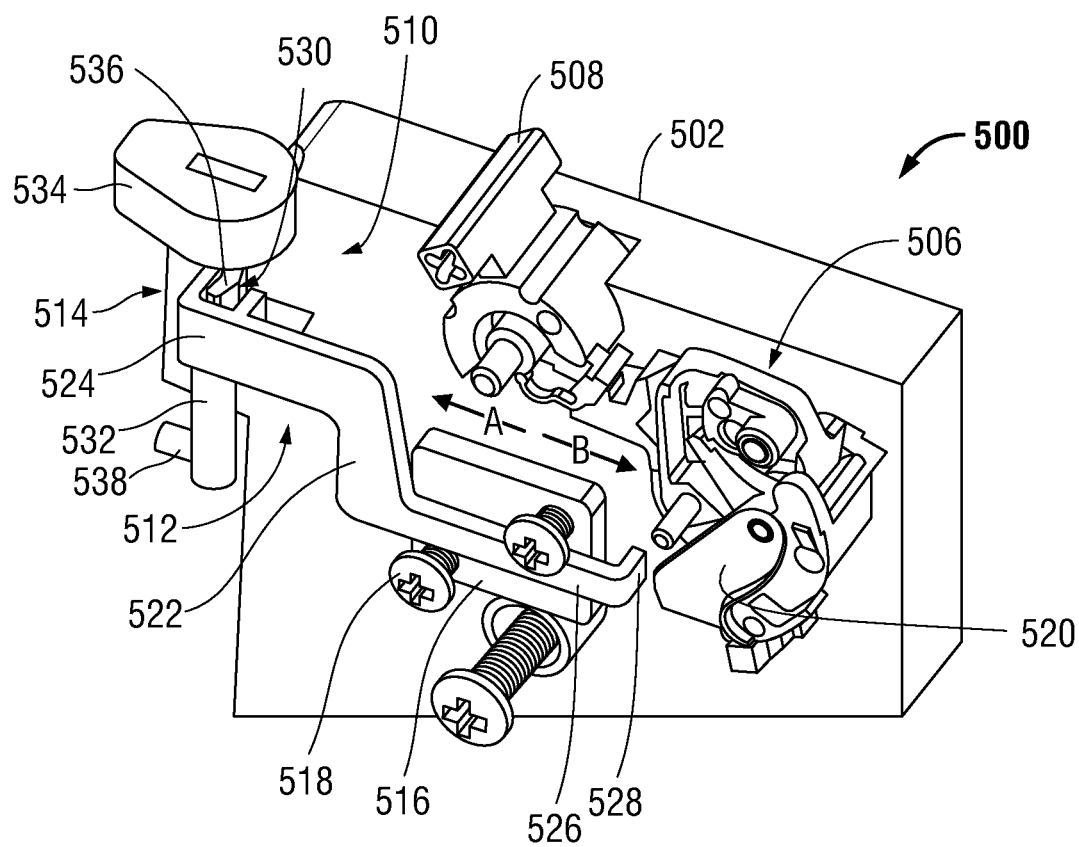
FIG. 5 is perspective views of another interlock assembly according to some implementations of the disclosed embodiments.

FIG. 5 depicts another circuit breaker 500 having an interlock assembly according to the exemplary disclosed embodiments. Like previously described embodiments, the circuit breaker 500 includes a molded casing 502 and a trip unit 506 for tripping the circuit breaker 500. A handle 508 is connected to the trip unit 506 and operable to set or reset the trip unit 506 into an ON state, an OFF state, or a tripped state. A manually-controlled interlock assembly 510 may be provided in the circuit breaker 500 that interacts with a circuit breaker panel (not expressly shown) to prevent inadvertent installation or removal of the circuit breaker 500 from the circuit breaker panel while current is flowing. Like the previously described embodiments, the interlock assembly 510 may include an interfering member 512 configured to interfere with the operation of the trip unit 506 and an actuator 514 coupled to actuate the interfering member 512. In some embodiments, a support plate 516 and one or more screws 518 or other fasteners may be provided to movably mount the interlock assembly 510 within the circuit breaker 500.

As can be seen, the trip unit 506 includes a trip lever 520 and the interfering member 512 may block or otherwise interfere with the operation of the trip lever 520. The interfering member 512 may take the form of a blocking arm or link 522 having a drive end 524 and a blocking end 526 opposite the drive end 524. The blocking end 526 may terminate in a blocking bar 528 or similar structure that is designed to contact and push trip lever 520 and the drive end 524 may have a slot 530 or similar structure formed therein for engaging the actuator 514. The actuator 514 may take the form of a locking pin having an elongated shaft 532 and a head portion 534 at one end of the shaft 532 that may resemble a pear shape in some embodiments. The locking pin 514 may also include a drive arm 536 extending from the shaft 532 for driving the blocking arm 522 and a retention post 538 extending from the shaft 532 that obstructs or restrains the locking pin 514 (and hence the circuit breaker 500) from being inserted into or removed from the circuit breaker panel 212 until after the trip unit 506 has been placed into the tripped state.

When the locking pin 514 is properly assembled with the blocking arm 522, the interlock assembly 510 operates in much the same way as the previously described interlock assembly 224. That is, the drive arm 536 of the locking pin 514 engages the slot 530 of the blocking arm 522 such that rotating the locking pin 514 also drives the blocking arm 522. Operating the locking pin 514 to move put the blocking arm 522 in the direction indicated by the arrow "A" puts the blocking arm 522 into the non-interfering position, which puts the locking pin 514 into the locked position where it works together with the circuit breaker panel (not expressly shown) to prevent insertion and removal of the circuit breaker 500 into the panel. Conversely, operating the locking pin 514 to move the blocking arm 522 in the direction indicated by the arrow "B" puts the blocking arm 522 into the interfering position, which puts the locking pin 514 into the unlocked position where it is neither obstructed nor restrained by the circuit breaker panel, so the circuit breaker 500 may be freely inserted and removed from the panel. This helps avoid inadvertent insertion or removal the circuit breaker 500 until after the blocking arm 522 has been put into the interfering position to put the trip unit 506 into the tripped state.

Figure 6:
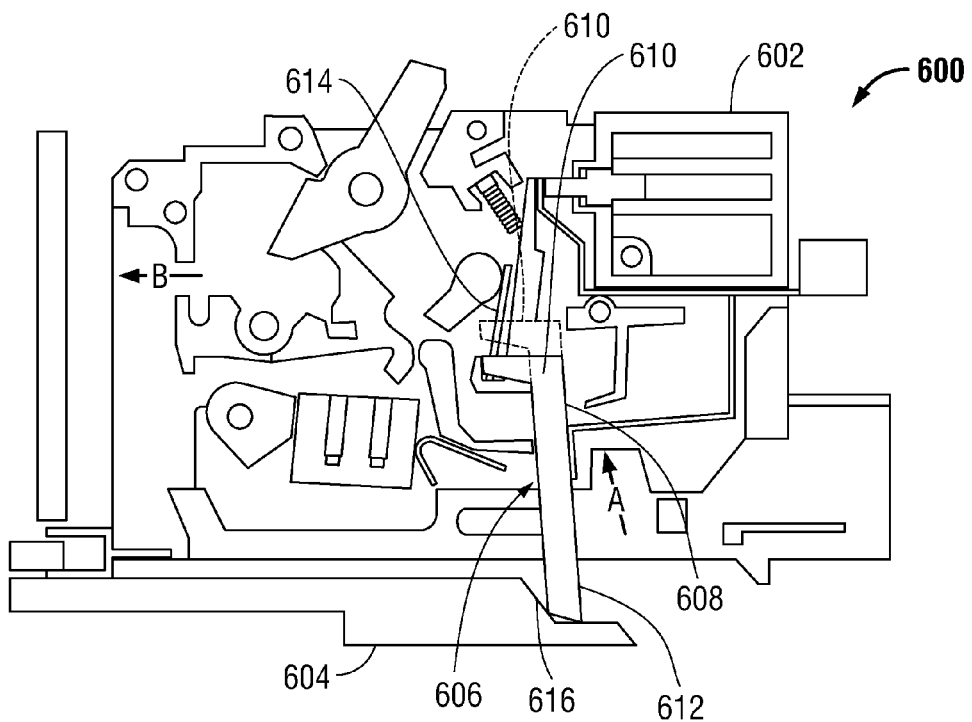
FIG. 6 is a perspective view of still another interlock assembly according to some implementations of the disclosed embodiments.

FIG. 6 illustrates an exemplary circuit breaker 600 where, instead of a locking pin and the generally horizontal blocking arm described thus far, the interlock assembly may comprise a generally vertical blocking arm. In FIG. 6, the molded casing 602 has been opened up in order to show an internal view as the circuit breaker 600 is being installed in a circuit breaker panel 604, only partially seen here. The interlock assembly 606 in this embodiment may include a substantially vertical blocking arm 608 mounted in the molded casing 602 such that the blocking arm 608 may be moved generally up and down, as indicated by the arrow "A." The blocking arm 608 may have a blocking end 610 designed to block or otherwise interfere with operation of an armature 614 and a drive end 612 for engaging or otherwise contacting the circuit breaker panel 604. Like the previously described horizontal blocking arm, the vertical blocking arm may 608 may be movable between an interfering position in which it prevents the armature 614 from latching or engaging a latch, for example, by holding back a bimetal member (not expressly shown) attached to the armature 614, and a non-interfering position in which the armature 614 is allowed to function normally.

When the circuit breaker 600 is separated from the circuit breaker panel 604, the blocking arm 608 is typically biased in the interfering position so that the armature 614 is prevented from engaging the latch, thereby keeping the circuit breaker 600 in a tripped state. The circuit breaker 600 may then be installed in the circuit breaker panel 604 by sliding it laterally relative to the circuit breaker panel 604 in the direction shown by the arrow "B." This sliding movement causes the drive end 612 of the blocking arm 608 to contact a slope 616 on the circuit breaker panel 604, which imparts a linear force that pushes the blocking arm 608 up into the non-interfering position. In this position, the blocking end 610 no longer interferes with the armature 614, as indicated by the dashed lines, and the circuit breaker 600 may be set or reset as needed.

Figure 7:
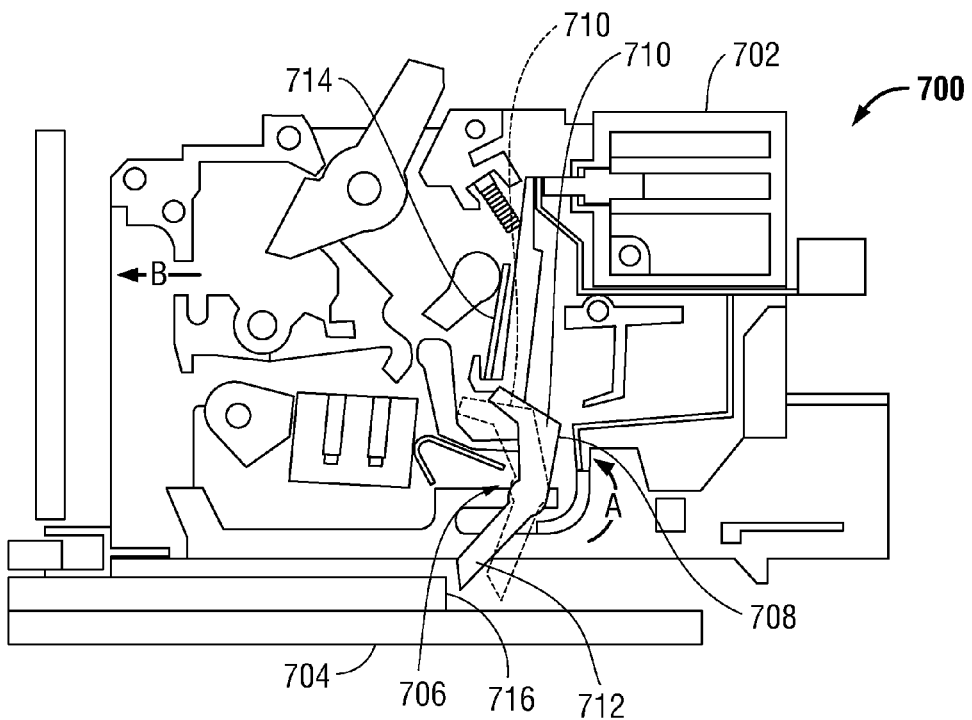
FIG. 7 is a perspective view of yet another interlock assembly according to some implementations of the disclosed embodiment.

FIG. 7 illustrates an exemplary circuit breaker 700 that is similar to the circuit breaker 600 in FIG. 6, except the interlock assembly may comprise a generally rotary blocking arm. In FIG. 7, the molded casing 702 again has been opened up to show an internal view as the circuit breaker 700 is being installed in a circuit breaker panel 704. The interlock assembly 706 in this embodiment may include a rotary blocking arm 708 mounted about a pivot or hinge (not expressly shown) in the molded casing 702 such that the blocking arm 708 may rotate, as indicated by the arrow "A." As before, the blocking arm 708 may have a blocking end 710 designed to block or otherwise interfere with operation of an armature 714 and a drive end 712 for engaging or otherwise contacting the circuit breaker panel 704. This rotary blocking arm 708 may then be rotated between an interfering position in which it prevents the armature 714 from latching or engaging a latch, for example, by holding back the armature or otherwise interfering with the armature or a component attached to the armature, and a non-interfering position in which the armature 714 is allowed to function normally.

When the circuit breaker 700 is apart from the circuit breaker panel 704, the blocking arm 708 is normally biased in the interfering position so that the armature 714 is prevented from engaging the latch and the circuit breaker 700 is in a tripped state. As before, the circuit breaker 700 may then be installed in the circuit breaker panel 704 by sliding it laterally relative to the circuit breaker panel 704 in the direction shown by the arrow "B." This sliding movement causes the drive end 712 of the blocking arm 708 to contact a ledge 716 on the circuit breaker panel 704, which imparts a rotary force to rotate the blocking arm 708 into the non-interfering position. In such position, the blocking end 710 no longer interferes with the armature 714, as indicated by the dashed lines, and the circuit breaker 700 may be set or reset as needed.

Figure 8:
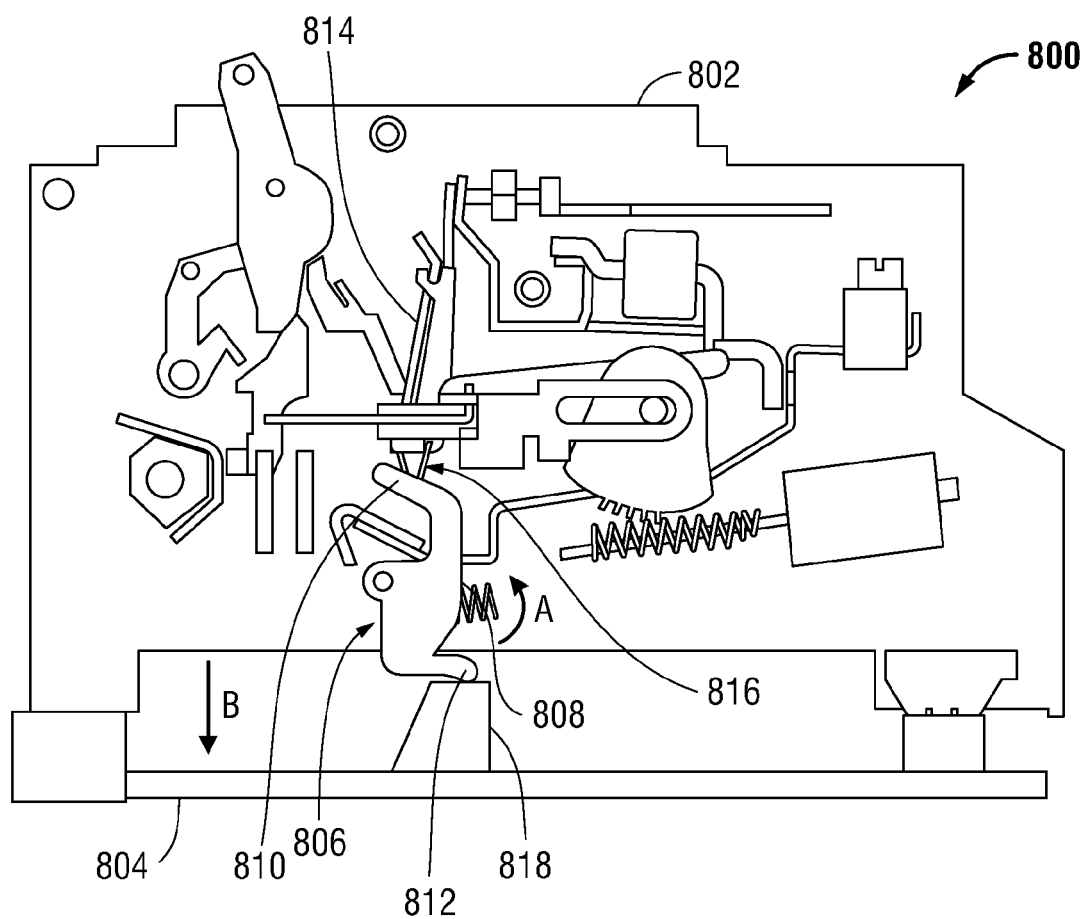
FIG. 8 is a perspective view of still another interlock assembly according to some implementations of the disclosed embodiment.

FIG. 8 illustrates an exemplary circuit breaker 800 that is similar to the circuit breaker 700 in FIG. 7, except the circuit breaker 800 is installed by pushing it down into the circuit breaker panel instead of sliding. In FIG. 8, the molded casing 802 has once again been opened up to show an internal view as the circuit breaker 800 is being installed in the circuit breaker panel 804. The interlock assembly 806 in this embodiment may also include a rotary blocking arm 808 mounted about a pivot or hinge (not expressly shown) in the molded casing 802 such that the blocking arm 808 may rotate, as indicated by the arrow "A." As before, the blocking arm 808 may have a blocking end 810 designed to block or otherwise interfere with operation of an armature 814 and a drive end 812 for engaging or otherwise contacting the circuit breaker panel 804. The rotary blocking arm 808 may then be rotated between an interfering position in which it prevents the armature 814 from latching or engaging a latch, for example, by holding back a bimetal member/thermal compensator 816 attached to the armature 814, and a non-interfering position in which the armature 814 is allowed to function normally.

When the circuit breaker 800 is free from the circuit breaker panel 804, the blocking arm 808 is usually biased in the interfering position so that the armature 814 is prevented from engaging the latch and the circuit breaker 800 is in a tripped state. The circuit breaker 800 may then be installed in the circuit breaker panel 804 by pushing it down into the circuit breaker panel 804 in the direction shown by the arrow "B." This downward movement causes the drive end 812 of the blocking arm 808 to contact a stump 818 on the circuit breaker panel 804, which imparts a rotary force to rotate the blocking arm 808 into the non-interfering position. In this non-interfering position, the blocking end 810 no longer interferes with the armature 814 and the circuit breaker 800 may be set or reset as needed.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. An interlock assembly for a circuit breaker, comprising:
   an interfering member movable between an interfering position and a non-interfering position, the interfering member configured to prevent the circuit breaker from being in, or being set to, an ON state when the interfering member is in the interfering position, and allow the circuit breaker to be in, or be set to, the ON state when the interfering member is in the non-interfering position; and
   an actuator movable between a locked position and an unlocked position, the actuator configured to operate in tandem with a circuit breaker panel to prevent insertion of the circuit breaker into the circuit breaker panel when the actuator is in the locked position, and allow insertion of the circuit breaker into the circuit breaker panel when the actuator is in the unlocked position;
   wherein the actuator is coupled to the interfering member such that moving the actuator into the unlocked position also moves the interfering member into the interfering position and causes the circuit breaker to trip if the breaker is in the ON state.

2. The interlock assembly of claim 1, wherein the actuator is coupled to the interfering member such that moving the actuator into the locked position also moves the interfering member into the non-interfering position.

3. The interlock assembly of claim 1, further comprising a biasing member configured to continuously compel the interfering member toward the interfering position.

4. The interlock assembly of claim 1, wherein the interfering member includes a blocking arm configured to block an armature of a trip unit of the circuit breaker from engaging a latch of the trip unit to prevent a trip unit reset when the interfering member is in the interfering position.

5. The interlock assembly of claim 1, wherein the actuator is in the form of a locking pin having a head portion connected to a shaft and a drive post protruding from the shaft, the drive post configured to contact the interfering member and move the interfering member into the non-interfering position when the actuator is moved into the locked position.

6. The interlock assembly of claim 5, wherein the locking pin includes a retention post protruding from the shaft and configured to block insertion of the circuit breaker into the circuit breaker panel when the actuator is in the locked position, and allow insertion of the circuit breaker into the circuit breaker panel when the actuator is in the unlocked position.

7. The interlock assembly claim 6, wherein the retention post can be moved to block removal of the circuit breaker from the circuit breaker panel once the circuit breaker has been inserted in the circuit breaker panel.

8. The interlock assembly claim 7, wherein the retention post is positioned a predefined angular distance from the drive post on the shaft of the locking pin.

9. A miniature circuit breaker, comprising:
a line terminal;
a load terminal;
a trip unit connected between the line terminal and the load terminal, the trip unit configured to interrupt current flow between the line terminal and the load terminal when the trip unit is tripped; and
an interlock assembly coupled to the trip unit and configured to operate in tandem with a circuit breaker panel to prevent insertion of the circuit breaker into the circuit breaker panel until after the trip unit has been tripped, and prevent removal of the circuit breaker from the circuit breaker panel until after the trip unit has been tripped.

10. The miniature circuit breaker of claim 9, wherein the interlock assembly includes an interfering member movable between an interfering position and a non-interfering position, the interfering member configured to interfere with a set or reset operation of the trip unit when the interfering member is in the interfering position, and allow the set or reset operation of the trip unit when the interfering member is in the non-interfering position.

11. The miniature circuit breaker of claim 10, wherein the interlock assembly further includes an actuator movable between a locked position and an unlocked position, the actuator configured to operate in tandem with the circuit breaker panel to prevent insertion of the circuit breaker into the circuit breaker panel when the actuator is in the locked position, and allow insertion of the circuit breaker into the circuit breaker panel when the actuator is in the unlocked position.

12. The miniature circuit breaker of claim 11, wherein the actuator is coupled to the interfering member such that moving the actuator into the locked position also moves the interfering member into the non-interfering position.

13. The miniature circuit breaker of claim 11, wherein the interlock assembly further includes a biasing member configured to continuously compel the interfering member toward the interfering position.

14. The miniature circuit breaker of claim 13, wherein the actuator is coupled to the interfering member such that moving the actuator into the unlocked position allows the interfering member to be moved into the interfering position by the biasing member.

15. An interlock assembly for a miniature circuit breaker, comprising:
a blocking arm mounted in the miniature circuit breaker and movable between an interfering position and a non-interfering position, the blocking arm configured to cause a trip and block a set or reset operation of a trip unit of the circuit breaker when the blocking arm is in the interfering position, and allow the set or reset operation of the trip unit when the blocking arm is in the non-interfering position;
a spring coupled to the blocking arm and configured to continuously bias the blocking arm toward the interfering position; and
a locking pin coupled to the blocking arm and movable between a locked position and an unlocked position, the locking pin configured to operate in tandem with a circuit breaker panel to prevent insertion of the circuit breaker into the circuit breaker panel when the locking pin is in the locked position, and allow insertion of the circuit breaker into the circuit breaker panel when the locking pin is in the unlocked position;
wherein the locking pin is coupled to the blocking arm in such a way that moving the locking pin into the locked position also moves the blocking arm into the non-interfering position, and moving the locking pin into the unlocked position also moves the blocking arm into the interfering position.

16. The interlock assembly of claim 15, wherein the blocking arm interferes with the set or reset operation of the trip unit by blocking an armature of the trip unit from engaging a latch of the trip unit when the blocking arm is in the interfering position.

17. The interlock assembly of claim 15, wherein the locking pin has a head portion connected to a shaft and a drive post protruding from the shaft, the drive post configured to contact the blocking arm and move the blocking arm into the non-interfering position when the locking pin is moved into the locked position.

18. The interlock assembly of claim 17, wherein the locking pin includes a retention post protruding from the shaft and configured to block insertion of the circuit breaker into the circuit breaker panel when the locking pin is in the locked position, and allow insertion of the circuit breaker into the circuit breaker panel when the locking pin is in the unlocked position.

19. The interlock assembly claim 18, wherein the retention post is further configured to engage a catch structure of the circuit breaker panel when the locking pin is in the locked position to prevent removal of the circuit breaker from the circuit breaker panel.

20. The interlock assembly claim 18, wherein the retention post is positioned a predefined angular distance from the drive post on the shaft of the locking pin.

* * * * *